No. 627,441. Patented June 20, 1899.
I. F. PECK.
HOLDER FOR FLIES OF BOOTS OR SHOES.
(Application filed Feb. 11, 1899.)
(No Model.)
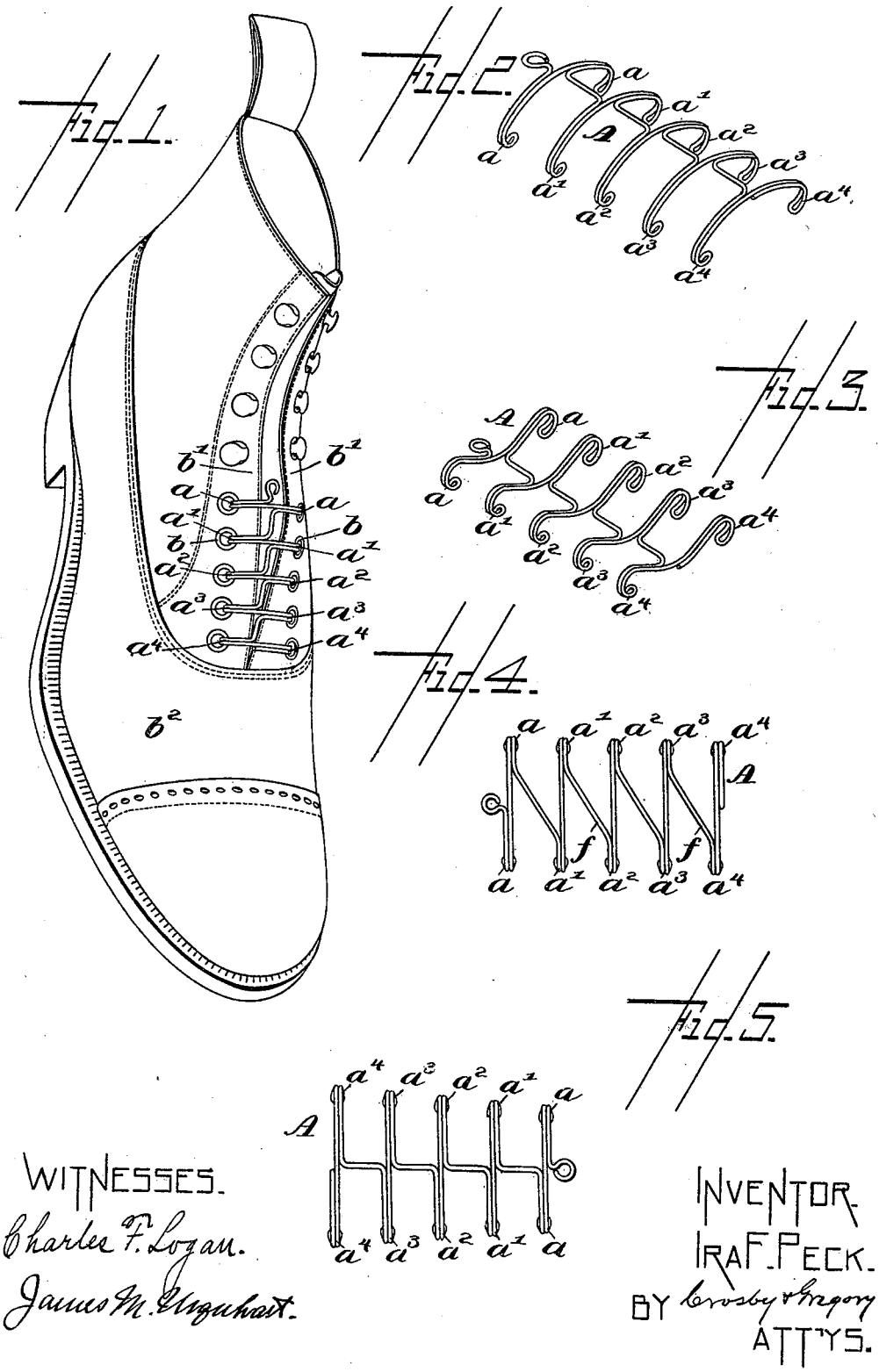
WITNESSES.
Charles F. Logan.
James M. Urquhart.
INVENTOR.
Ira F. Peck.
BY Crosby & Gregory
ATT'YS.

UNITED STATES PATENT OFFICE.

IRA F. PECK, OF AUBURN, RHODE ISLAND, ASSIGNOR TO THE VICTORIA SELF-LACING COMPANY, OF PORTLAND, MAINE, AND BOSTON, MASSACHUSETTS.

HOLDER FOR FLIES OF BOOTS OR SHOES.

SPECIFICATION forming part of Letters Patent No. 627,441, dated June 20, 1899.

Application filed February 11, 1899. Serial No. 705,319. (No model.)

*To all whom it may concern:*

Be it known that I, IRA F. PECK, of Auburn, county of Providence, State of Rhode Island, have invented an Improvement in Holders for the Flies of Boots or Shoes, of which the following description, in connection with the accompanying drawings, is a specification, like letters on the drawings representing like parts.

This invention has for its object the production of a novel holder for holding together the flies or eyeleted edges of boots and shoes, the said holder being very desirable as an adjunct in lasting and also for use in show-windows where boots and shoes are sold.

My improved holder is shown as composed of wire-like material bent to present opposed engaging members in pairs, the holder presenting a plurality of such pairs, said pairs of engaging members being readily separable one pair with relation to an adjacent pair to thereby enable the engaging members to be put readily into the eyelet-holes of the flies whatever may be the extent of separation of the eyelets in the same edge of the fly. Herein the pairs of engaging devices are shown as connected across the holder by a single branch, so that one pair may be readily changed as to its distance from another pair to adapt the engaging members of each pair to different eyelet-spacings, and, preferably, as herein shown, the wire at and near the bent portions thereof containing hooks and constituting the engaging device is separable substantially to the base of each hook.

The holder may be made from one piece of wire, and, as herein shown, the wire may be so bent that the hooks constituting each pair of engaging devices may be separated for the desired distance according to the work to be done, and the opposed hooks of each pair, their distances apart having been determined before the hooks are bent, are thereafter substantially inseparable one from the other; but the hooks of adjacent pairs may be separated one hook from the other for any desired distance, according to whether or not the eyelets are set at a uniform distance from the edge of the fly or at varying distances therefrom, as in some boots and shoes.

In my holder it will be noticed that the two engaging devices constituting each pair are directly opposed one to the other across the holder, so that the position of both hooks of each pair is defined and the hooks of each pair kept in all conditions of the holder both in use and out of use the same distance apart.

Figure 1 in perspective shows one form of holder embodying my invention, the same being in place, holding the flies of a shoe. Fig. 2 shows the holder detached. Fig. 3 shows a holder like that represented in Fig. 2, but bent differently to enable the engaging devices to enter the eyelets from the inner sides of the flies. Fig. 4 shows a modified form of holder, and Fig. 5 shows yet another modification.

For the production of a holder embodying my invention I may take a piece of wire-like material A and bend it in such shape as to present a series of pairs $a'$ $a^2$ $a^3$ $a^4$ of engaging devices, the holder herein shown representing four such pairs. The engaging devices are shown as bent to form hooks to enter and engage the eyelets $b$ of the flies $b'$ of a boot or shoe $b^2$, and the hooks of each pair are substantially opposed one to the other and are connected across the holder, so that one hook of one pair may always be maintained in all conditions of the holder at the same distance from the opposed hook of the pair, or, in other words, there is no open free space in the direction of the length of the holder separating the hooks of the same pair. It will be understood, however, that the distance between one and the other hook of the same pair may be varied according to the particular location of the eyelets with relation to the edges of the flies—as, for instance, in the modification Fig. 5 the hooks of each successive pair are separated for varying distances in order that the engaging devices may engage and hold flies together—in which the eyelet-holes are spaced back from the edges of the flies for different distances.

In Fig. 1 it will be noticed that the wire entering into the engaging devices of each pair is made to lie substantially parallel for a considerable distance back from the base of each hook of the pair, so that the wire connecting adjacent pairs of engaging devices in series is shown as a single branch, it occupying a position substantially central with relation to the opposed hooks of the series of pairs of engaging devices, so that each pair is connected with an adjacent pair with but a single branch of wire, such construction making a very desirable holder and leaving the engaging devices of each pair substantially free to be easily separated more or less from the engaging devices of an adjacent pair, as may be necessary to enable the engaging devices of the several pairs to enter the eyelets of the flies, said eyelets being separated uniformly or otherwise along the edge of each fly.

In Figs. 1 and 2 it will be noticed that the wire composing the holder is bent outwardly away from the ends of the hooks forming the engaging devices to thereby enable the holder to fit externally the flies; but in case it is desired to enable the hooks or engaging devices to enter the inner sides of the eyelets then the holder must be bent oppositely, as shown in Fig. 3.

Fig. 4 shows a modified form of holder, and viewing said figure the wire is shown as led from the base of one hook diagonally, as at $f$, to the base of the hook of another pair, care being taken, however, in bending the wire that the engaging devices of each pair stand substantially opposite or face each other in order that they may enter properly opposed eyelet-holes in edges of the flies, and in this construction it will be readily understood that the angle of inclination of the part or branch $f$ of the wire with relation to adjacent pairs of engaging devices determines the degree of separation of one pair of engaging devices from or with relation to an adjacent pair, and the single branch $f$ enables the pairs of engaging devices to be readily moved toward and from an adjacent pair.

I believe myself to be the first to make from wire a holder having a series of engaging devices arranged in pairs, one hook of each pair being connected directly across the holder with the wire entering into the hook of the other pair, I thereby obviating a space between the opposed hooks of the pair. I desire to maintain the two hooks of each pair always substantially in the same relative position one with the other, and as my holder is constructed the hooks of each pair cannot be moved one away from the other, as if the hooks of each pair were separated by a space extended longitudinally of the holder between the hooks of each pair; but the two hooks of one pair may be readily moved toward or from the two hooks of an adjacent pair.

This invention is not limited to the exact bends shown in the wire, nor is it limited in all instances to making the holder of one continuous wire without any cut or separation in it, as I consider within the gist of my invention a holder composed of wire, said holder possessing the novel characteristics hereinbefore described as to the location of the hooks of each pair of the engaging members and the yielding nature of the hooks of one pair with relation to the hooks of an adjacent pair.

In the absence of a more concise and better term to designate the eyeleted part of the top to be connected by shoe-lacings I have used the terms "fly" and "flies" to designate such eyeleted edges.

Having described my invention, what I claim as new, and desire to secure by Letters Patent, is—

1. A holder for uniting the flies of boots and shoes, the same consisting of wire-like material bent to present a series of opposed engaging members connected in pairs, each pair of engaging members being free to yield with relation to the engaging members of an adjacent pair, to thereby enable each pair of engaging members to readily enter the eyelet-holes of the flies, substantially as described.

2. A holder for uniting the flies of boots and shoes, the same consisting of wire-like material bent to present in succession engaging devices arranged in pairs, the said pairs being connected one pair to the other by means of a single branch of wire, substantially as described.

3. A holder for uniting the flies of boots and shoes, the same consisting of wire-like material bent to present a series of opposed engaging members, the wire entering into the engaging member of one pair being carried across the holder and bent to form the engaging member of an adjacent pair, substantially as described.

4. A holder for uniting the flies of boots and shoes, the same consisting of wire-like material presenting a series of opposed engaging members, the wire entering into the engaging members of the series of pairs of engaging members at one side the longitudinal center of the holder passing from said engaging members to the opposed engaging members at the opposite side of the longitudinal center of the holder, substantially as described.

5. A holder for uniting the flies of boots and shoes, the same consisting of wire-like material bent to present a series of pairs of opposed engaging members, each pair of engaging members being connected to its adjacent pair by a branch of the wire entering into the formation of the holder, substantially as described.

6. A holder for uniting the flies of boots and shoes, the same consisting of a single piece of wire-like material bent to present a series of opposed engaging members connected in pairs, the hooks of each pair being directly opposed, each pair of engaging members being yieldingly connected with the adjacent pair of engaging members, substantially as described.

7. A holder for shoe-flies, the same consisting of wire presenting a series of eyelet-engaging devices arranged in pairs, an engaging device of each pair being connected across the space between the flies with the fellow of the pair, each pair of engaging devices being connected with an adjacent pair of engaging devices by a piece of the wire of which the engaging devices are formed, said engaging devices holding together firmly the parts of the flies engaged by it irrespective of other pairs of engaging devices, substantially as described.

8. A holder for uniting the flies of boots and shoes, the same consisting of wire-like material bent to present a series of pairs of engaging members, the wire in each pair of engaging members between the hooked ends thereof being adapted to fit the shoe and last, each pair of engaging members being connected to its adjacent pair by a branch of the wire entering into the formation of the holder, substantially as described.

In testimony whereof I have signed my name to this specification in the presence of two subscribing witnesses.

IRA F. PECK.

Witnesses:
GEO. W. GREGORY,
MATTHIAS BROCK.